(12) United States Patent
Saraf

(10) Patent No.: US 11,715,119 B2
(45) Date of Patent: Aug. 1, 2023

(54) GEOGRAPHIC RECOMMENDATION PLATFORM

(71) Applicant: eBay Inc., San Jose, CA (US)

(72) Inventor: Bindia Saraf, Sunnyvale, CA (US)

(73) Assignee: EBAY INC., San Jose, CA (US)

( * ) Notice: Subject to any disclaimer, the term of this patent is extended or adjusted under 35 U.S.C. 154(b) by 926 days.

(21) Appl. No.: 16/392,429

(22) Filed: Apr. 23, 2019

(65) Prior Publication Data

US 2020/0342467 A1     Oct. 29, 2020

(51) Int. Cl.
*G06Q 30/0202*     (2023.01)
*G06Q 30/0204*     (2023.01)

(52) U.S. Cl.
CPC ..... *G06Q 30/0202* (2013.01); *G06Q 30/0205* (2013.01)

(58) Field of Classification Search
CPC ............ G06Q 30/0202; G06Q 30/0205; G06F 16/9535; G06F 16/9537; G06F 16/29
USPC .............................................. 705/7.34, 7.31
See application file for complete search history.

(56) References Cited

U.S. PATENT DOCUMENTS

| | | | |
|---|---|---|---|
| 8,606,636 B1 | 12/2013 | Keoshkerian | |
| 10,769,647 B1 * | 9/2020 | Milden | G06Q 30/0254 |
| 11,157,930 B1 * | 10/2021 | Bachu | G06Q 30/0201 |
| 2004/0054589 A1 | 3/2004 | Nicholas et al. | |
| 2008/0162270 A1 | 7/2008 | Kim et al. | |
| 2009/0164294 A1 | 6/2009 | Hu et al. | |
| 2009/0216571 A1 | 8/2009 | Sunshine et al. | |
| 2010/0205039 A1 | 8/2010 | Basak et al. | |
| 2012/0054113 A1 | 3/2012 | Jayaraman et al. | |
| 2013/0073337 A1 * | 3/2013 | Wu | G06Q 30/02 705/7.31 |
| 2015/0019287 A1 * | 1/2015 | Sacco | G06Q 30/0202 705/7.31 |
| 2015/0088700 A1 | 3/2015 | Hamilton et al. | |

(Continued)

FOREIGN PATENT DOCUMENTS

WO     2020/219247 A1     10/2020

OTHER PUBLICATIONS

Wang, Marketing Issues at On-Line Auctions, Carnegie Mellon University (2004) (Year: 2004).*

(Continued)

*Primary Examiner* — Charles Guiliano
(74) *Attorney, Agent, or Firm* — Schwegman Lundberg & Woessner, P.A.

(57) ABSTRACT

Disclosed are systems, methods, and non-transitory computer-readable media for a geographic recommendation platform. The geographic recommendation platform receives data identifying a geographic region specified by a user and gathers data relating to the geographic region. The geographic recommendation platform determines, based on the data relating to the geographic region, an anticipated demand for an item within geographic region. The anticipated demand indicates how likely the item is to be purchased by a user that is located within the geographic region. The geographic recommendation platform generates a recommendation for the item based on the anticipated demand. The recommendation indicates the anticipated demand for the item within the geographic region. The geographic recommendation platform transmits the recommendation to the user.

20 Claims, 16 Drawing Sheets

(56) References Cited

U.S. PATENT DOCUMENTS

2016/0063597 A1  3/2016  Goulart

OTHER PUBLICATIONS

International Preliminary Report on Patentability Received for PCT Patent Application No. PCT/US2020/026140, dated Nov. 4, 2021, 10 Pages.
International Search Report received for PCT Application No. PCT/US2020/026140, dated Jun. 16, 2020, dated Jun. 16, 2020, 3 pages.
International Written Opinion received for PCT Application No. PCT/US2020/026140, dated Jun. 16, 2020, dated Jun. 16, 2020, 8 pages.

\* cited by examiner

GEOGRAPHIC RECOMMENDATION PLATFORM

TECHNICAL FIELD

An embodiment of the present subject matter relates generally to generating recommendation and, more specifically, to a geographic recommendation platform.

BACKGROUND

Online marketplace services allow users to buy and sell items. For example, these services enable users to post listings for each item that the user wishes to sell, as well as view listings posted by other users. While these types of services make selling and buying items easy, they provide challenges as well. Sellers do not directly interact with customers in an online setting and therefore may be unaware of the items for which there is a current demand. This may make some users hesitant to list items for sale because they do not want to waste time creating listing for items that are unlikely to sell. Further, sellers may be missing out on an opportunity to meet a demand in the market. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
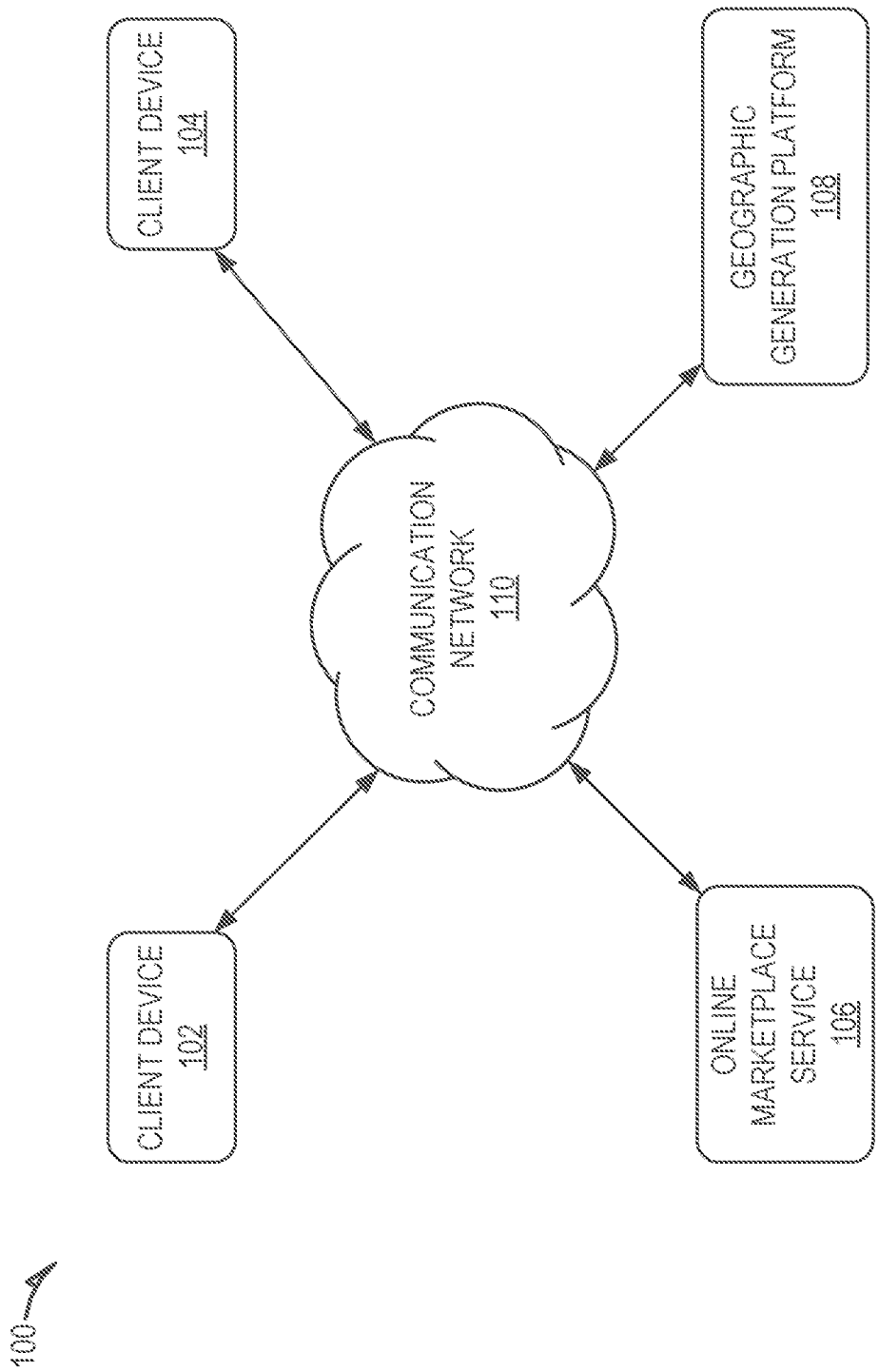
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a geographic recommendation platform. The geographic recommendation platform generates recommendations based on an anticipated demand within a geographic region for an item or items. For example, the recommendation may recommend that a user list an item for sale because the anticipated demand for the item is high within the geographic region. As another example, the recommendation may recommend that a user not list an item for sale because the anticipated demand for the item is low within the geographic region.

The user may use the generated recommendations to determine which items to list for sale on the online marketplace. This provides several improvements over previous system. For example, the recommendations result in a reduction in the amount of time and effort spent posting listings for items that are not likely to sell. This reduction in the number of postings reduces resource usage and improves the user interface by removing listings for items that are not of interest.

The geographic recommendation platform may generate recommendations for users based on data provided by the user. For example, the geographic recommendation platform may provide an interface that enables a user to designate an item and a geographic region. The geographic recommendation platform generates a recommendation based on the provided data. For example, the geographic recommendation platform determines the anticipated demand within the geographic region for the specified item and then generates a recommendation based on the anticipated demand.

The geographic recommendation platform may also generate recommendations for users without receiving a designation of an item. For example, the geographic recommendation platform may determine the anticipated demand within the geographic region for a variety of items. The geographic recommendation platform may generate a recommendation for users located in the geographic region to either list or not list the item for sale. For example, if the anticipated demand is above a threshold level, the geographic recommendation platform may provide users located in the geographic region with a recommendation to list the item for sale. As another example, if the anticipated demand is below a threshold level, the geographic recommendation platform may provide users located in the geographic region with a recommendation to not list the item for sale. As another example, the geographic recommendation platform may rank the items based on their anticipated demand and then generate recommendations based on the rankings. For example, the geographic recommendation platform may recommend that users list the highest ranked items for sale and not list the lowest ranked item.

The geographic recommendation platform determines the anticipated demand for an item within the geographic region based on historical sale data for the online marketplace, demographic user data and/or geographic data. The historical sale data includes data describing listings previously posted to the online marketplace, such as the items listed for sale, the listed sale price, whether the item was sold, an elapsed time until the item was sold, the user that purchased the item, demographic data associated with the purchasing user, etc. The demographic includes data describing users, such as their addresses, age, job, education level, nationality, etc. Geographic data describes a geographic region itself, such as events occurring in the geographic area.

The geographic recommendation platform may determine an anticipated demand for an item based on a subset of the described data that is specific to the geographic region. For example, the geographic recommendation platform may use historical sales data describing listing posted by users located within the geographic region to determine the anticipated demand for an item within the geographic region. The geographic recommendation platform may also use data associated with other geographic regions. For example, the geographic recommendation platform may identify similar geographic regions (e.g., similar location, similar demographic makeup, etc.) and use the aggregated data from the similar geographic regions to generate recommendations for uses within those regions. As another example, the geographic recommendation platform may use the anticipated demand for an item within a geographic region to make recommendations to users located in other similar geographic regions.

In some embodiments, the geographic recommendation platform may determine the anticipated demand for items based on a state or expected state of the geographic region. The state of the geographic region indicates the condition of the geographic region at a given time. For example, the state may indicate the weather, time of year, natural disasters, upcoming events, etc. The geographic recommendation platform may determine an estimated demand for the geographic region based on historical sales data gathered in the geographic and/or other geographic regions during a similar or same state. For example, the geographic recommendation platform may determine that there is a high anticipated demand for air fans when the temperature increases. As another example, the geographic recommendation platform may determine that there is a high demand for binders when schools in the geographic area are set to begin the new school year.

FIG. 1 shows an example system 100, wherein electronic devices communicate via a network for purposes of exchanging content and other data. As shown, multiple devices (i.e., client device 102, client device 104, online marketplace service 106, and geographic recommendation platform 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online marketplace service 106 to utilize the services provided by the online marketplace service 106. The online marketplace service 106 provides an online marketplace in which users may post items for sale and purchase items posted for sale by other users. For example, the online marketplace service 160 may include items being auctioned for sale and/or items listed for sale at a set price. Users communicate with and utilize the functionality of the online marketplace service 106 by using the client devices 102 and 104 that are connected to the communication network 110 by direct and/or indirect communication.

Although the shown system 100 includes only two client devices 102, 104, this is only for ease of explanation and is not meant to be limiting. One skilled in the art would appreciate that the system 100 can include any number of client devices 102, 104. Further, the online marketplace service 106 may concurrently accept connections from and interact with any number of client devices 102, 104. The online marketplace service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online marketplace service 106 via a client-side application installed on the client devices 102 and 104. In some embodiments, the client-side application includes a component specific to the online marketplace service 106. For example, the component may be a stand-alone application, one or more application plug-ins, and/or a browser extension. However, the users may also interact with the online marketplace service 106 via a third-party application, such as a web browser, that resides on the client devices 102 and 104 and is configured to communicate with the online marketplace service 106. In either case, the client-side application presents a user interface (UI) for the user to interact with the online marketplace service 106. For example, the user interacts with the online marketplace service 106 via a client-side application integrated with the file system or via a webpage displayed using a web browser application.

The online marketplace service 106 is one or more computing devices configured to facilitate an online marketplace (e.g., EBAY, AMAZON, etc.) in which users may post items for sale and purchase items posted for sale by other users. For example, the online marketplace service 106 provides a user interface in which users may view item listings posted to the online marketplace service 106. Each item listing provides details for an item or items listed for sale. For example, the item listing may include an item description, images, sale price, current bid price, auction time remaining, etc.

The online marketplace service 106 may further provide functionality that enables a user to purchase and/or bid on an item. For example, the online marketplace service 106 may provide user interface elements (e.g., button, text fields, etc.) that a user may use to select purchase an item, place a bid, etc., as well as provide their financial (e.g., credit card number, bank account number) and personal information (e.g., shipping address, billing address, etc.) to complete the purchase.

To list an item for sale on the online marketplace, a user creates a user account with the online marketplace service 106. The user account may include the user's personal information (e.g., name, address, email address, phone number, etc.) and financial information (e.g., credit card information, bank account information, etc.). Once the user has created a user account, the user may then use their user account to utilize the functionality of the online marketplace service 106, including listing an item for sale on the online marketplace. The online marketplace service 106 provides users with a listing interface that enables a user to create a new listing as well as provide data for the listing. For example, the listing interface may include data fields that prompt the user to provide specified information for the listing, such as the price, description, etc. The listing interface may also include user interface elements, such as buttons, that enable the user to submit and/or post a completed listing. That is, the user may post the listing after the user has filled in the data fields included in the listing interface.

The online marketplace service 106 provides users with geographic based recommendations based on an anticipated demand for an item within a geographic location. The anticipated demand is a value indicating how likely an item posted for sale on the online marketplace is to be purchased by a user located within the geographic region within a given time frame. The recommendation indicates the anticipated demand for the item and provides a recommendation as to whether the users should or should not post the item for sale on the online marketplace. For example, the recommendation may recommend that the user list the item for sale when the anticipated demand for the item is high within the geographic region. As another example, the recommendation may recommend that the user not list the item for sale when the anticipated demand for the item is low within the geographic region.

The online marketplace service 106 utilizes the functionality of the geographic recommendation platform 108 to provide the recommendations to users of the online marketplace service 106. Although the geographic recommendation platform 108 and the online marketplace 106 are shown as separate entities, this is just for ease of explanation and is not meant to be limiting. In some embodiments, the geographic recommendation platform 108 is incorporated as part of the online marketplace service 106.

In some embodiments, the geographic recommendation platform 108 generates recommendations for users based on data provided by the user. For example, the geographic recommendation platform 108 may provide an interface that enables a user to designate an item and a geographic region. The geographic recommendation platform 108 generates a recommendation based on the provided data. For example, the geographic recommendation platform 108 determines the anticipated demand within the geographic region for the specified item and then generates a recommendation based on the anticipated demand.

The geographic recommendation platform 108 may also generate recommendations for users without receiving a designation of an item from the user. For example, the geographic recommendation platform 108 may determine the anticipated demand within the geographic region for a variety of items and determine recommendations based on the anticipated demand for the items. For example, if the anticipated demand for an item is above a threshold level, the geographic recommendation platform 108 may provide users located in the geographic region with a recommendation to list the item for sale. As another example, if the anticipated demand is below a threshold level, the geographic recommendation platform 108 may provide users located in the geographic region with a recommendation to not list the item for sale.

As another example, the geographic recommendation platform 108 may rank the items based on their anticipated demand and then generate recommendations based on the rankings. For example, the geographic recommendation platform 108 may recommend that users list the items that are ranked highest and recommend that the user not list the items that are ranked lowest.

The geographic recommendation platform 108 determines the anticipated demand for an item within the geographic region based on historical sale data for the online marketplace, demographic user data, and/or geographic data. The historical sale data includes data describing listings previously posted to the online marketplace, such as the items listed for sale, the listed sale price, whether the item was sold, an elapsed time until the item was sold, the user that purchased the item, demographic data associated with the purchasing user, etc. The demographic includes data describing users, such as their addresses, age, job, education level, nationality, etc. Geographic data describes a geographic region itself, such as events occurring in the geographic area.

The geographic recommendation platform 108 may determine an anticipated demand for an item based on a subset of the data that is specific to the geographic region. For example, the geographic recommendation platform 108 may use historical sales data describing listing posted by users located within the geographic region to determine the anticipated demand for an item within the geographic region. The geographic recommendation platform 108 may also use data associated with other geographic regions. For example, the geographic recommendation platform may identify similar geographic regions (e.g., similar location, similar demographic makeup, etc.) and use the aggregated data from the similar geographic regions to generate recommendations for uses within those regions. As another example, the geographic recommendation platform 108 may use the anticipated demand for an item within a geographic region to make recommendations to users located in other similar geographic regions.

In some embodiments, the geographic recommendation platform 108 may determine the anticipated demand for items based on a state or expected state of the geographic region. The state of the geographic region indicates the condition of the geographic region at a given time. For example, the state may indicate the weather condition, time of year, natural disasters, upcoming events, etc. The geographic recommendation platform 108 may determine the current and or upcoming state of a geographic region and determine an estimated demand for items in the geographic region based on historical sales data gathered during a similar or same state. For example, the historical sales data may indicate that the number of fans sold during a heat wave increased. Accordingly, the geographic recommendation platform 108 may use this data to determine that there is a high anticipated demand for fans during an existing or upcoming heat wave within the geographic area. As another example, the historical data may indicate that the number of binders sold prior to the beginning of the school year increased. Accordingly, the geographic recommendation platform 108 may determine that there is a high anticipated demand for binders within a geographic prior to the beginning of the new school year.

Figure 2:
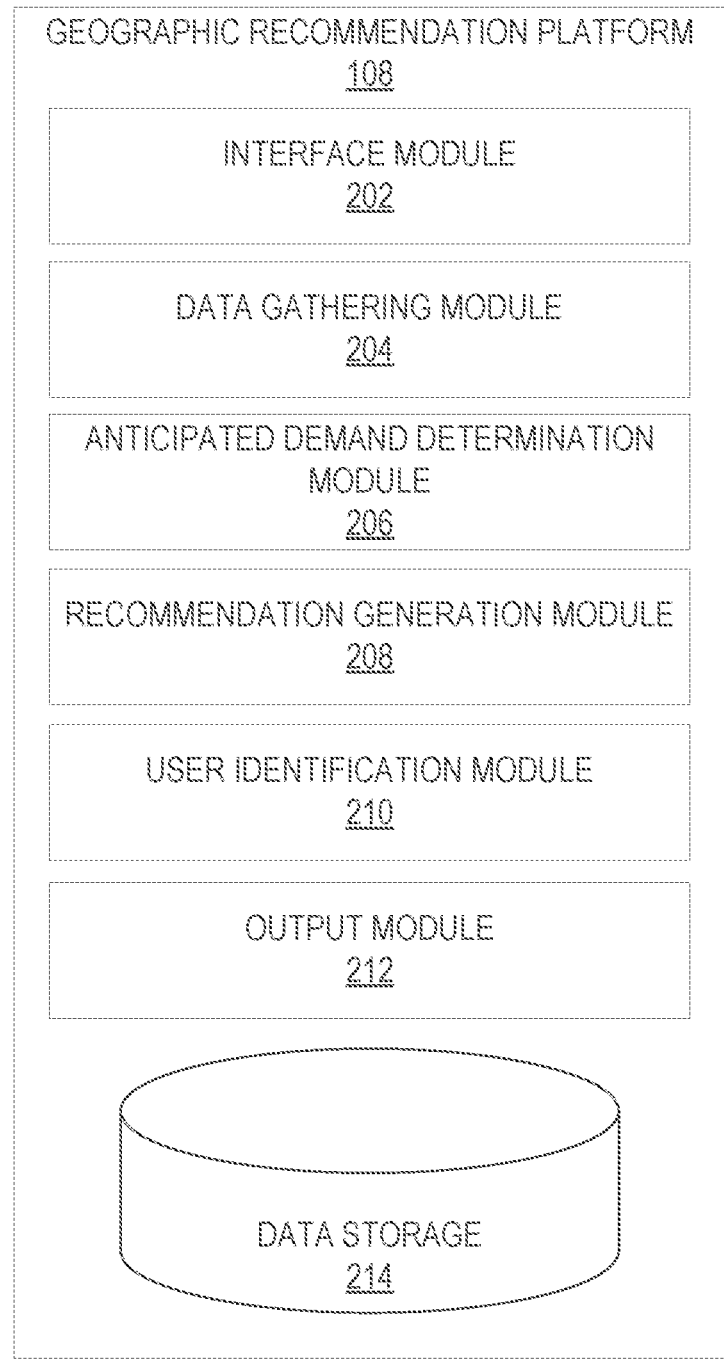
FIG. 2 is a block diagram of the geographic recommendation platform, according to some example embodiments.

FIG. 2 is a block diagram of the geographic recommendation platform 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the geographic recommendation platform 108 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the geographic recommendation platform 108 and the online marketplace service 106.

As shown, the geographic recommendation platform 108 includes, an interface module 202, a data gathering module 204, an anticipated demand determination module 206, a recommendation generation module 208, a user identification module 210, an output module 212, and a data storage 214.

The interface module 202 provides a recommendation user interface that enables a user to the request demand data and/or recommendations, as well as view generated recommendations. The recommendation user interface provides user interface elements (e.g., text boxes, buttons, etc.) that enable a user to generate a request for a recommendation. For example, the user uses the recommendation user interface to enter data identifying a specific item, items and/or category of items, as well as a geographic region for the requested recommendation. The recommendation generation module 208 uses the submitted data to generate a corresponding recommendation for the user. The interface module 202 may present the user with the resulting recommendation within the recommendation user interface.

The recommendation user interface also enables a user to enroll/opt-in to receive recurring recommendations. For example, the user may use the recommendation user interface to provide parameters associated with the recommendations the user would like to receive. For example, the parameters may identify an item, items, types of items, etc., for which the user would like to receive recommendations. The parameters may also indicate a geographic region or regions for the recommendations. The user may also designate threshold anticipated demand levels for the recommendations. For example, the user may choose to receive recommendations for items that have an anticipated demand that is at or above the threshold anticipated level. As another example, the user may wish to receive recommendations for items that have an anticipated demand that is below the threshold anticipated demand level.

The data gathering module 204 gathers data used to generate recommendations. The data includes historical sale data for the online marketplace, demographic user data, and/or geographic data. The historical sale data includes data describing listings previously posted to the online marketplace, such as the items listed for sale, the listed sale price, whether the item was sold, an elapsed time until the item was sold, the user that purchased the item, demographic data associated with the purchasing user, etc. The demographic user data includes data describing users, such as their addresses, age, job, education level, nationality, etc. Geographic data describes a geographic region itself, such as events occurring in the geographic area. The data gathering module 204 gathers the data from the data storage 214 and/or third-party data providers (not shown). Although the data storage 214 is shown as being a part of the geographic recommendation platform 108, the data storage 214 or a portion thereof may be included in the online marketplace service 106. For example, the online marketplace service 106 may use the data storage 214 to store user account and listing data for the online marketplace.

The anticipated demand determination module 206 determines the anticipated demand for an item based on the data gathered by the data gathering module 204. The anticipated demand determination module 206 may determine an anticipated demand for an item based on a subset of the data that is specific to the geographic region. For example, the anticipated demand determination module 206 may use historical sales data describing listing posted by and/or purchased by users located within the geographic region to determine the anticipated demand for an item within the geographic region. The anticipated demand determination module 206 may also use data associated with other geographic regions. For example, the anticipated demand determination module 206 may identify similar geographic regions (e.g., similar location, similar demographic makeup, etc.) and use the aggregated data from the similar geographic regions to generate recommendations for users within those regions. As another example, the anticipated demand determination module 206 may use the anticipated demand for an item within a geographic region to make recommendations to users located in other similar geographic regions.

In some embodiments, the anticipated demand determination module 206 may determine the anticipated demand for items based on a state or expected state of the geographic region. The state of the geographic region indicates the condition of the geographic region at a given time. For example, the state may indicate the weather condition, time of year, natural disasters, upcoming events, etc. The anticipated demand determination module 206 may determine the current and or upcoming state of a geographic region and determine an estimated demand for items in the geographic region based on historical sales data gathered during a similar or same state. For example, the historical sales data may indicate that the number of fans sold during a heat wave increased. Accordingly, the anticipated demand determination module 206 may use this data to determine that there is a high anticipated demand for fans during an existing or upcoming heat wave within the geographic area. As another example, the historical data may indicate that the number of binders sold prior to the beginning of the school year increased. Accordingly, the anticipated demand determination module 206 may determine that there is a high anticipated demand for binders within a geographic prior to the beginning of the new school year. The functionality of the anticipated demand determination module 206 is described in greater detail below in relation to FIG. 3.

The recommendation generation module 208 generates recommendations based on the determined anticipated demand for an item or items. The recommendation may include data identifying the anticipated demand for the item. For example, the recommendation may include the value of the anticipated demand, such as a numeric value. Alternatively, the recommendation may include a representation of the anticipated demand, such as a high, medium or low. The recommendation generation module 208 determines the representation using threshold values defining ranges for each representation. For example, the recommendation generation module 208 determines which range the anticipated demand falls within and then uses the corresponding representation.

The generated recommendation also includes a written recommendation regarding whether the user should or should not list the item for sale. The recommendation generation module 208 may determine the recommendation based on the anticipated demand. For example, the recommendation generation module 208 may include a recommendation to list an item when the anticipated demand is above a threshold level. Alternatively, the recommendation generation module 208 may include a recommendation to not list an item when the anticipated demand is below a threshold level.

The generated recommendation may also include data explaining the anticipated demand and/or the recommendation. For example, the anticipated demand determination module 206 may provide the recommendation generation module 208 with data describing the factors that were factors in the anticipated demand for the item. The recommendation generation module 208 may include an explanation based on the provided factors, such as explaining that the anticipated demand is high due to an upcoming event, a high number of sales of the item in a similar geographic region, a high number of sales within the region, etc. As another example, the recommendation generation module 208 may include an explanation indicating that the anticipated demand is low because there is high available inventory for the item within the geographic region, the item does not sell well during a current and or upcoming state of the geographic region, etc.

The generated recommendation may also enable a user to begin the process of listing the item on the online marketplace. For example, the generated recommendation may include user interface elements, such as buttons, text boxes, etc., that the user may use to enter date, select post a listing, etc.

The user identification module 210 identifies users to receive the generated recommendations. The user identification module 210 may identify users within the geographic region that have selected to receive recommendations for the item or type of item. Alternatively, the user identification module 210 may identify users that have listed the item and/or similar items previously to receive the recommendations.

The output module 212 transmits the recommendations to the identified users. The output module 212 may transmit the recommendation using any of a variety of communication methods, such as email, text message, in-app message, etc.

Figure 3:
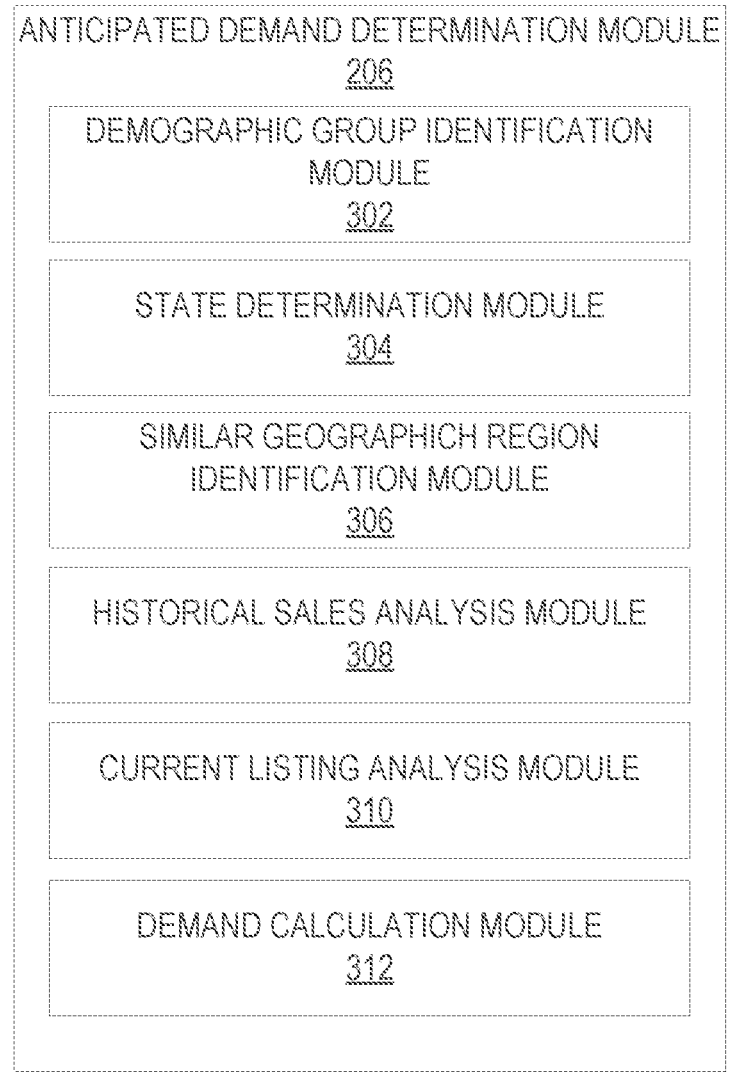
FIG. 3 is a block diagram of the anticipated demand determination module, according to some example embodiments.

FIG. 3 is a block diagram of the anticipated demand determination module 206, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the anticipated demand determination module 206 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the anticipated demand determination module 206 includes a demographic group identification module 302, a state determination module 304, a similar geographic region identification module 306, a historical sales analysis module 308, a current listing analysis module 310, and a demand calculation module 312.

The demographic group identification module 302 identifies demographic groups located within a geographic region. A demographic group is a group of users that share one or more common and/or similar demographic traits. For example, a demographic group may include users within a specified age range, users of a specified nationality, users with a specified education level, users with a specified income level, etc., and/or any combination thereof.

The demographic group identification module 302 uses demographic data for a geographic region and a set of predetermined demographic groups to identify the number of users in a geographic region that are members of each demographic group. The demographic group identification module 302 identifies the demographic groups that have strong presence in a geographic region. To accomplish this, the demographic group identification module 302 determines the demographic groups in the geographic are that represent at least a threshold percentage of the total population of the geographic area and/or the demographic groups that have at least a threshold number of members within the geographic are. The demographic group identification module 302 stores data identifying the demographic groups within a geographic region in the data storage 214.

The state determination module 304 determines a state or expected state of the geographic region. The state of the geographic region indicates the condition of the geographic region at a given time. For example, the state may indicate the weather, time of year, natural disasters, upcoming events, etc. The state determination module 304 determines the state of a geographic location based on the geographic data gathered by the data gathering module 204. For example, the state determination module 304 may use weather data gathered from a third-party service to determine the weather and/or expected weather in a geographic area. As another example, the state determination module 304 may use event data gathered from one or more third-party services to identify upcoming events in the area, such as concerts, celebrations, parades, school schedules, sporting events, etc.

In some embodiments, the state determination module 304 determines the state of the geographic region based on a listing of predefined states. For example, the listing of predefined states may indicate parameters defining each predetermined state. The state determination module 304 uses the gathered geographic data to determine whether the parameters of any of the predefined states is met and/or will be met at a future date. The state determination module 304 stores data defining the state of the geographic region in the data storage 214.

The similar geographic region identification module 306 identifies geographic regions that are similar to each other. Two geographic regions may be determined to be similar to each other based on one or more factors. For example, the similar geographic region identification module 306 may determine the two geographic regions are similar if they include the same or similar demographic groups, including similar sports franchises, universities, restaurants, industries, etc. As another example, the similar geographic region identification module 306 may determine that two geographic regions are similar based on the location of the geographic regions, such as the geographic regions being near each other and/or being similar geographically, such as being near mountain, near the beach, etc. As another example, the similar geographic region identification module 306 may determine that two geographic regions are similar based on the geographic regions frequently being in the same state, such as hot, rainy, etc. These are just some examples of some factors that the similar geographic region identification module 306 may consider and are not meant to be limiting.

In some embodiments, the similar geographic region identification module 306 calculates a similarity score between geographic regions based on one or more of the above described factors. The similarity score indicates how similar two geographic regions are. The similar geographic region identification module 306 determines that two geographic regions are similar if the similarity score for the two geographic regions meets or exceeds a threshold value. The similar geographic region identification module 306 stores data identifying the similar geographic regions in the data storage 214.

The historical sales analysis module 308 analyzes the historical sales data to determine sales performance of an item, group of items, and/or category of items. Sales performance indicates the level of ease or difficulty at which the item was sold. To accomplish this, the historical sales analysis module 308 identifies previously posted listings for the item, group of items, and/or category of items, and determines whether the identified listings resulted in a sale and an elapsed amount of time until the sale occurred. The historical sales analysis module 308 uses this data to determine the sales performance for the item. For example, the historical sales analysis module 308 may determine a percentage of the listing that resulted in a sale and an average time until conversion (e.g., until the listing resulted in a sale).

The historical sales analysis module 308 may perform the historical sales data based on all of the historical sales data or a subset of the historical sales data. For example, the historical sales analysis module 308 may analyze historical sales data for items listed for sale and/or purchased by users located in a single geographic region, group of similar geographic regions, etc. As another example, the historical sales analysis module 308 may analyze historical sales data for items listed for sale and/or purchased by users that are members of the same demographic group or set of similar demographic groups. As another example, the historical sales analysis module 308 may analyze historical sales data for items listed for sale and/or purchased by users located in geographic regions during a specified state.

The current listing analysis module 310 determines a current available inventory for an item within a geographic region. The current available inventory indicates a number of listings for the item and/or similar items that are located within the geographic area. The current available inventory is a relevant factor in determining the anticipated demand for an item. For example, if the current available inventory for the item is relatively high, then likelihood that the item will sell will be lower, even in situations where there is a relatively strong demand for the item. Likewise, if the current available inventory for the item is extremely low, the likelihood that the item will sell may be higher, even in situations where there is relatively weaker or moderate demand for the item.

The demand calculation module 312 calculates the value that represents the anticipated demand for the item within a geographic region. The demand calculation module 312 may calculate the value using any combination of the described data, subsets of data, and/or factors. The demand calculation module 312 may use any type of algorithm and may also apply weights to the various factors used to determine the anticipated demand.

Figure 4A:
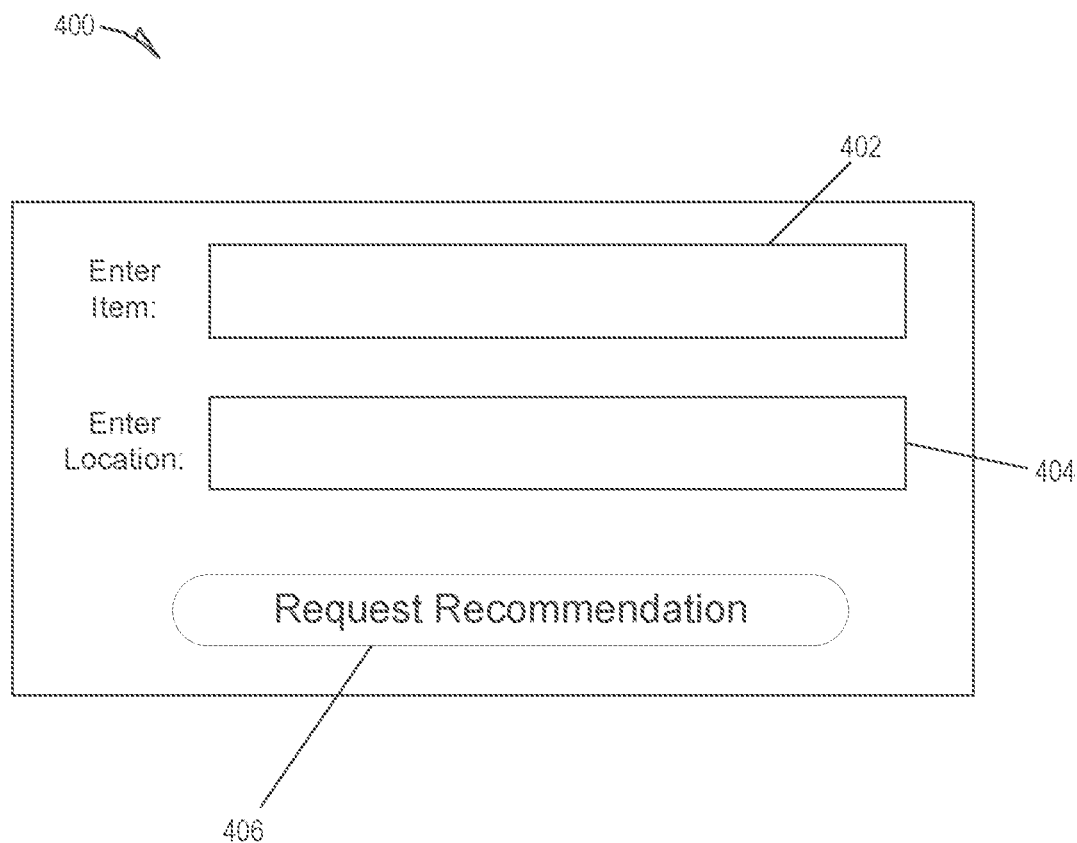
FIGS. 4A-4I show examples of a recommendation user interface providing a user with a recommendation, according to some example embodiments

FIGS. 4A-4I show examples of a recommendation user interface 400 providing a user with a recommendation, according to some example embodiments. As shown in FIG. 4A, the recommendation user interface 400 enables a user to provide data to request a recommendation. For example, the recommendation user interface 400 includes an enter item text field 402 that a user can use to enter an item for the recommendation. The recommendation user interface 400 also includes an enter location text field 404 that a user can use to enter the geographic location for the recommendation. The recommendation user interface 400 also includes a request recommendation button 406 that a user may select to submit the request.

Figure 4B:
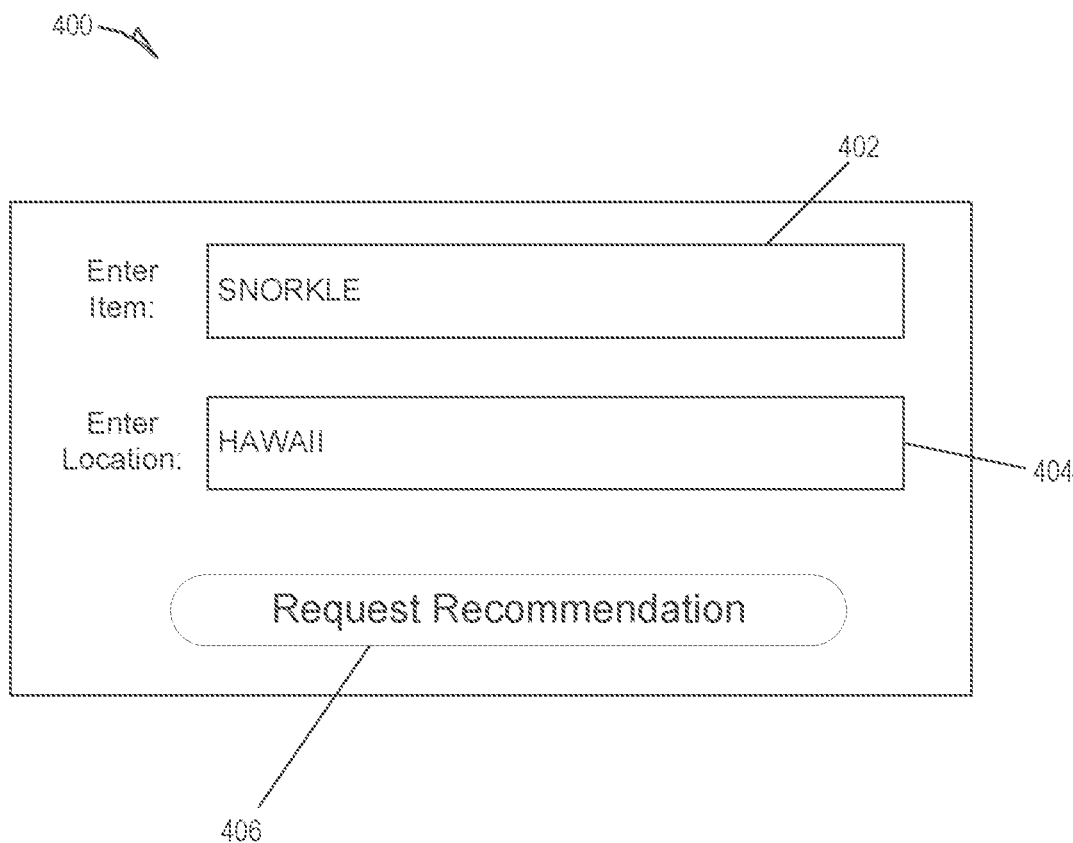

FIG. 4B shows the recommendation user interface 400 after the user has entered data into the enter item text field 402 and the enter location text field 404. As shown, the user has entered the item SNORKLE into the enter item text field 402 and entered the geographic location HAWAII into the enter location text field 404. The user may select the request recommendation button 406 to request a recommendation regarding whether to list a snorkel in Hawaii.

Figure 4C:
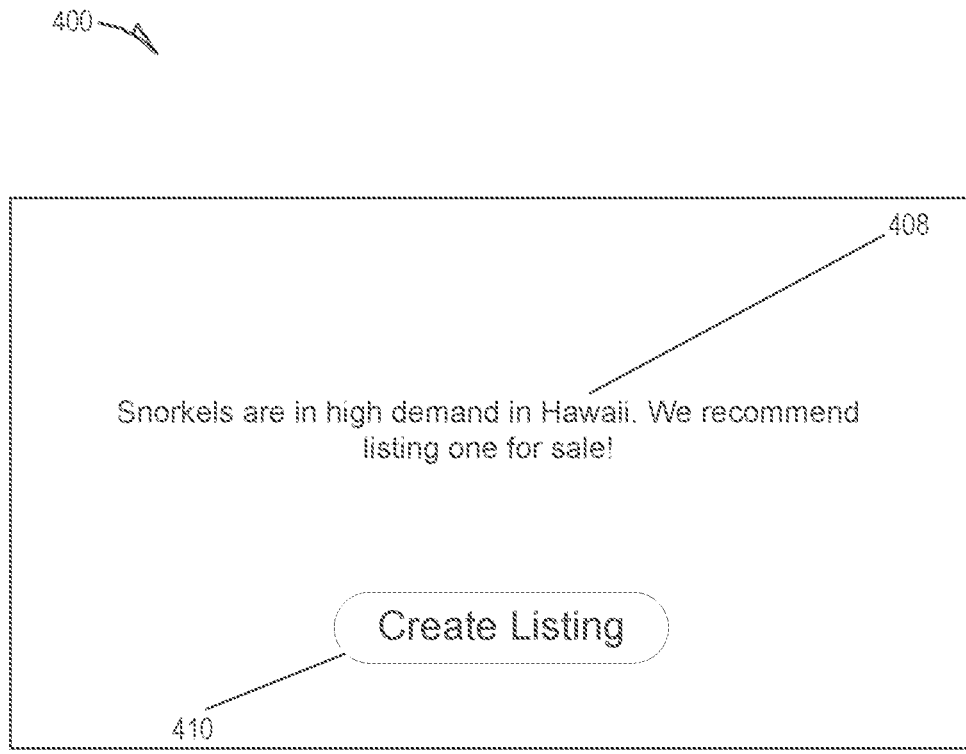

FIG. 4C shows the recommendation user interface 400 as a result of the user selecting the request recommendation button 406. As shown, the recommendation user interface 400 includes a text recommendation 408 indicating that the demand for snorkels is high in Hawaii and recommending that the user list the snorkel for sale to the online marketplace. The recommendation user interface 400 also includes a create listing button 410 that the user may select to initiate the process of generating a new listing.

Figure 4D:
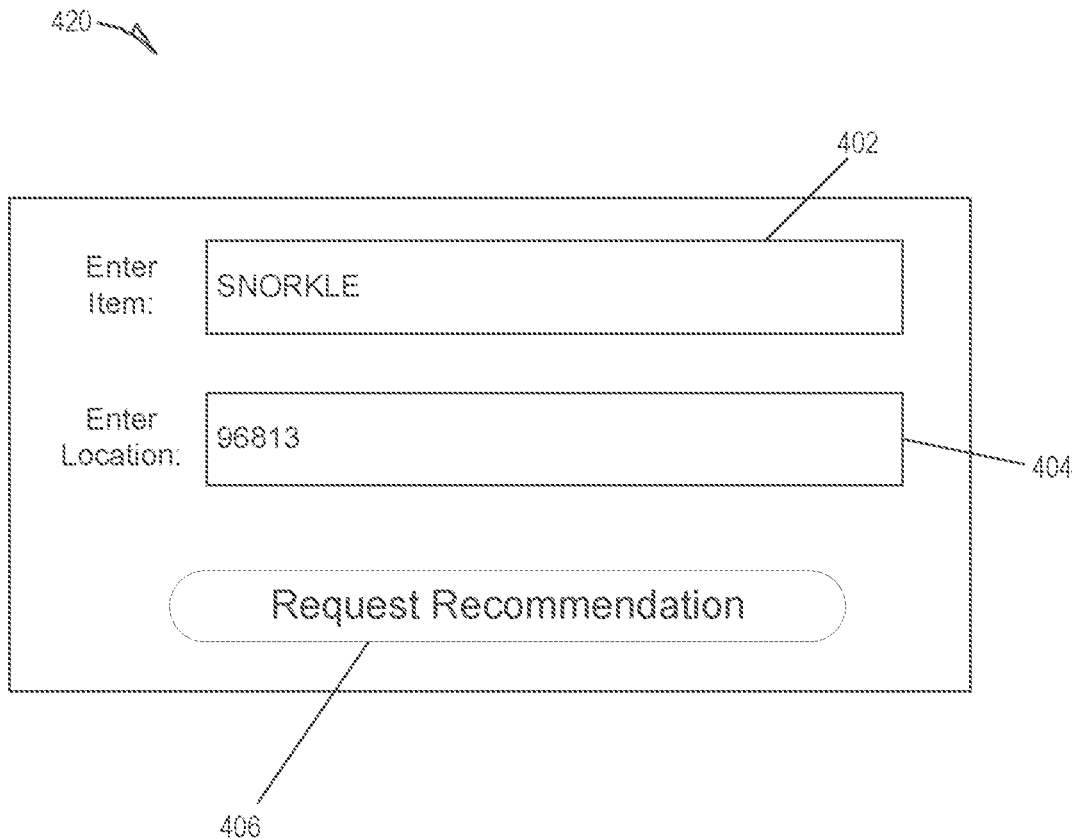

FIG. 4D shows another example of the recommendation user interface 420 after the user has entered data into the enter item text field 402 and the enter location text field 404. As shown, the user has entered the item SNORKLE into the enter item text field 402 and entered the zip code 96813 into the enter location text field 404. The user may select the request recommendation button 406 to request a recommendation regarding whether to list a snorkel in Hawaii.

Figure 4E:
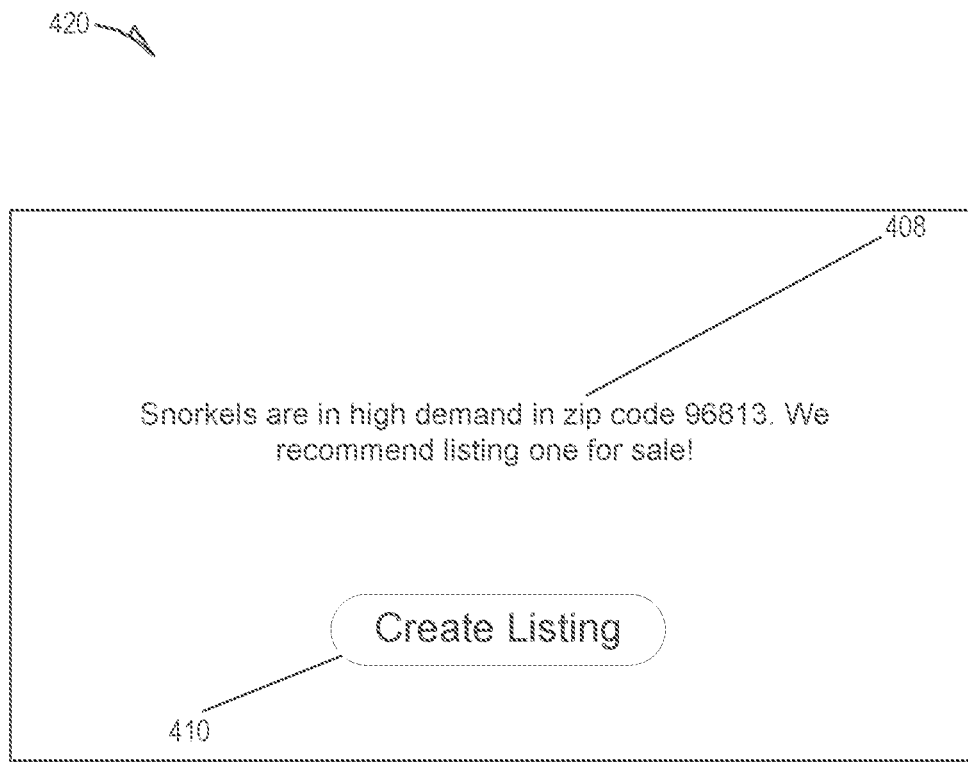

FIG. 4E shows the recommendation user interface 420 as a result of the user selecting the request recommendation button 406. As shown, the recommendation user interface 420 includes a text recommendation 408 indicating that the demand for snorkels is high in zip code 96813 and recommending that the user list the snorkel for sale to the online marketplace. The recommendation user interface 420 also includes a create listing button 410 that the user may select to initiate the process of generating a new listing.

Figure 4F:
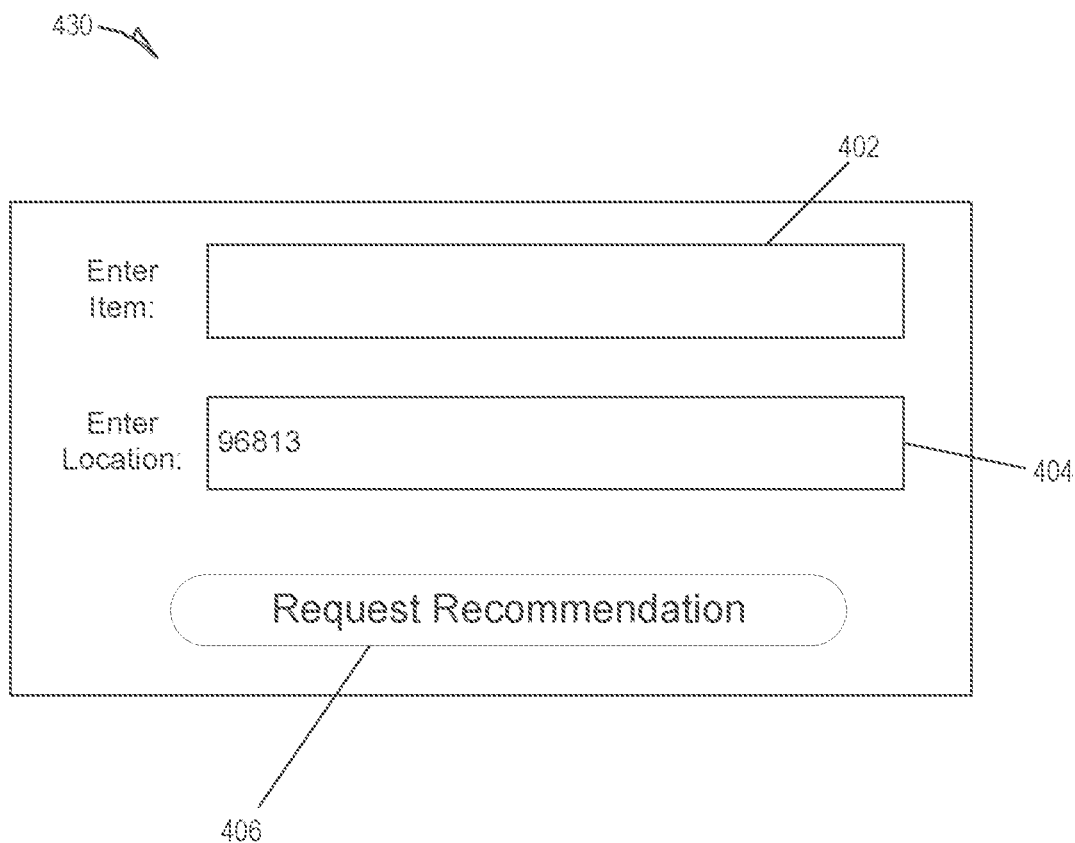

FIG. 4F shows another embodiment of the recommendation user interface 430 in which the user provides only a geographic location. As shown, the user has entered the zip code 96813 into the enter location text field 404 but has left the enter item text field 402 blank. The user may do this to receive a listing of items that are in high and/or low demand within the designated geographic area (e.g., zip code 96183).

Figure 4G:
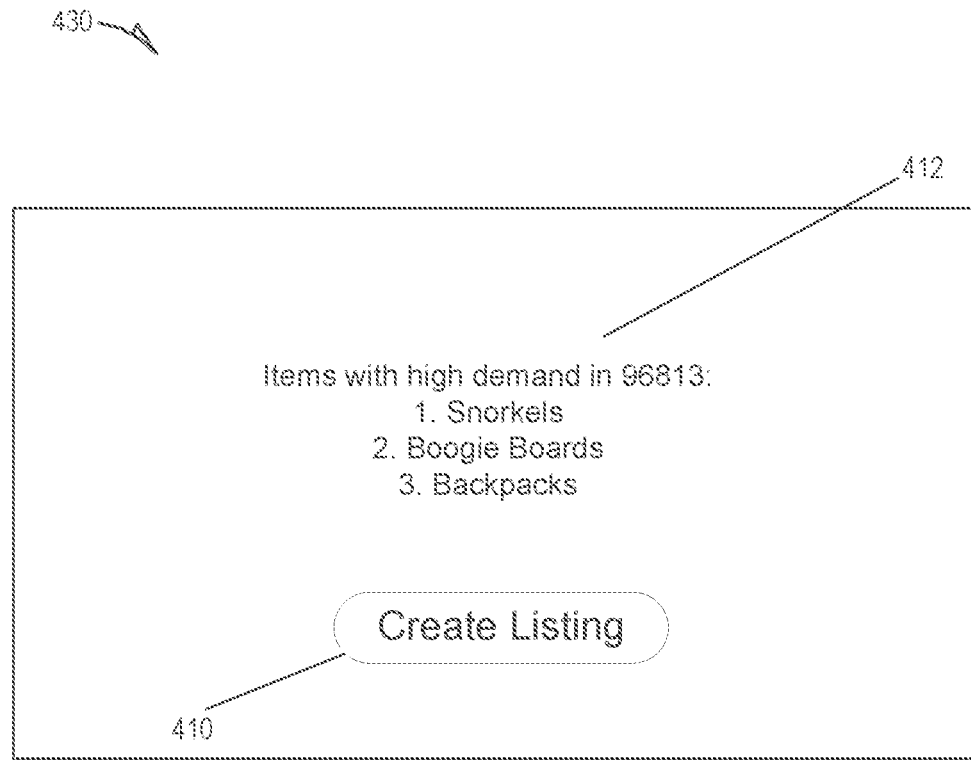

FIG. 4G shows the recommendation user interface 430 as a result of the user selecting the request recommendation button 406. As shown, the recommendation user interface 430 includes a text recommendation listing 412 indicating that items with high demand in zip code 96813 include snorkels, boogie boards and backpacks. In some embodiments, the items listed in the text recommendation listing 412 may be selectable to access additional data regarding why the specific items are in high demand. For example, a user may select snorkels to determine why snorkels are in high demand. As another example, the user may select backpacks to determine why backpacks are in high demand.

Figure 4H:
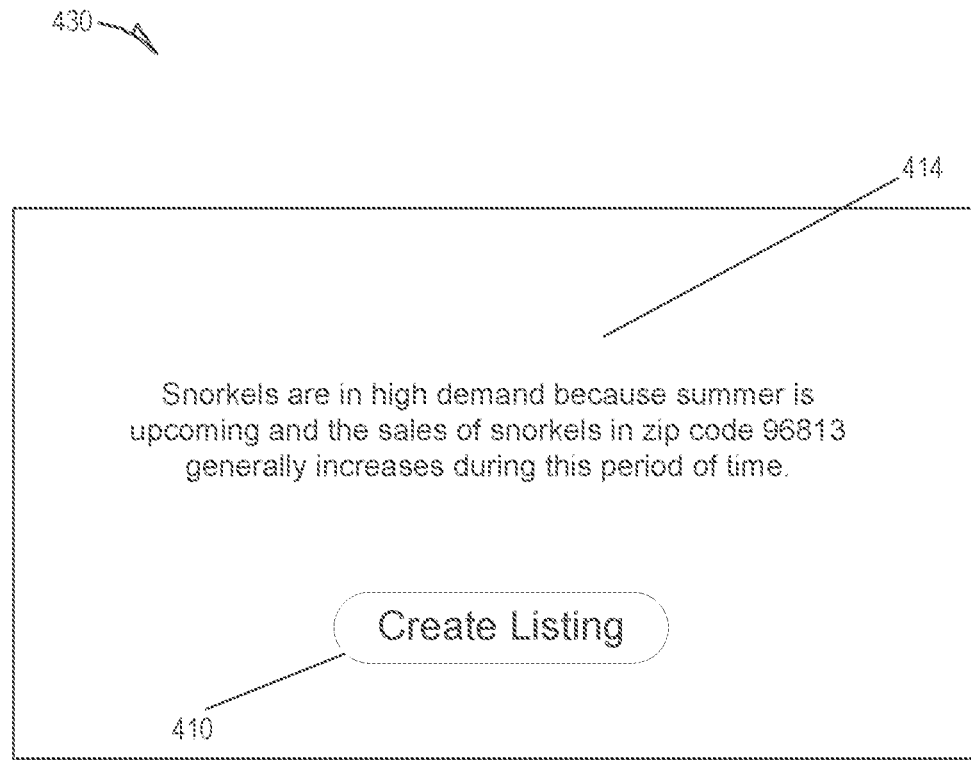

FIG. 4H shows the recommendation user interface 430 as a result of the user selecting snorkels. As shown, the recommendation user interface 430 includes an explanation text 414 that indicates that the demand for snorkels is high because summer is upcoming and the demand for snorkels in zip code 96813 generally increases during this period of time. The recommendation user interface 430 includes a create listing button 410 that the user may select to initiate the process of generating a new listing for snorkels.

Figure 4I:
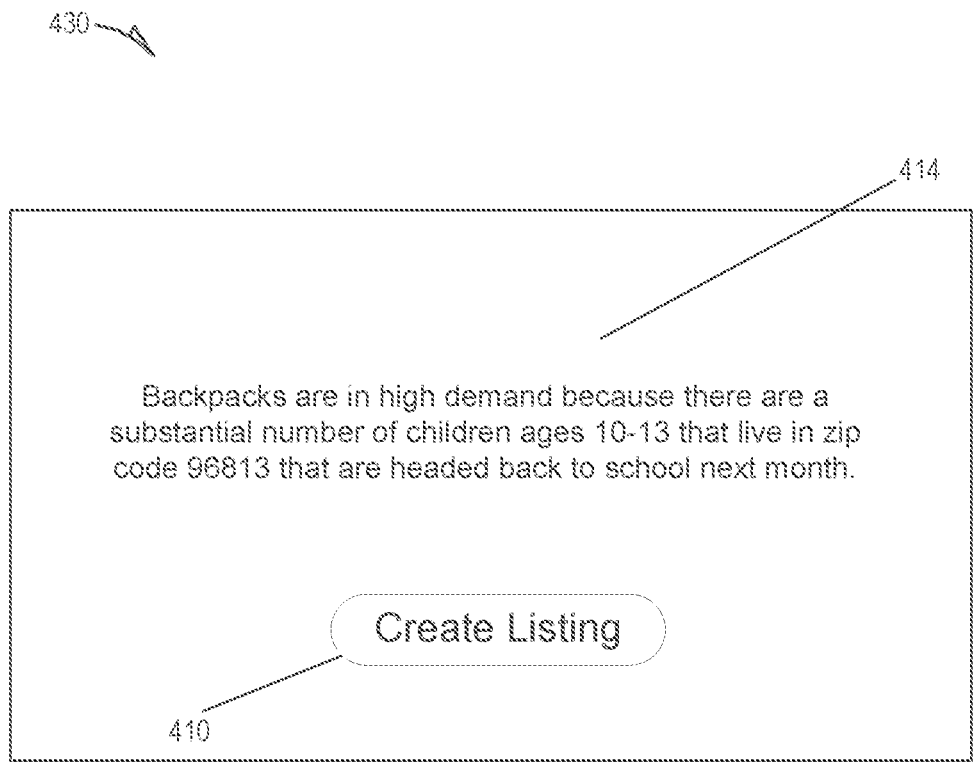

FIG. 4I shows an example of the recommendation user interface 430 as a result of the user selecting backpacks. As shown, the recommendation user interface 430 includes an explanation text 414 that indicates that the demand for backpacks is high because there are a substantial number of children ages 10-13 that live in zip code 96813 that are headed back to school next month. The recommendation user interface 430 includes a create listing button 410 that the user may select to initiate the process of generating a new listing for backpacks.

Figure 5:
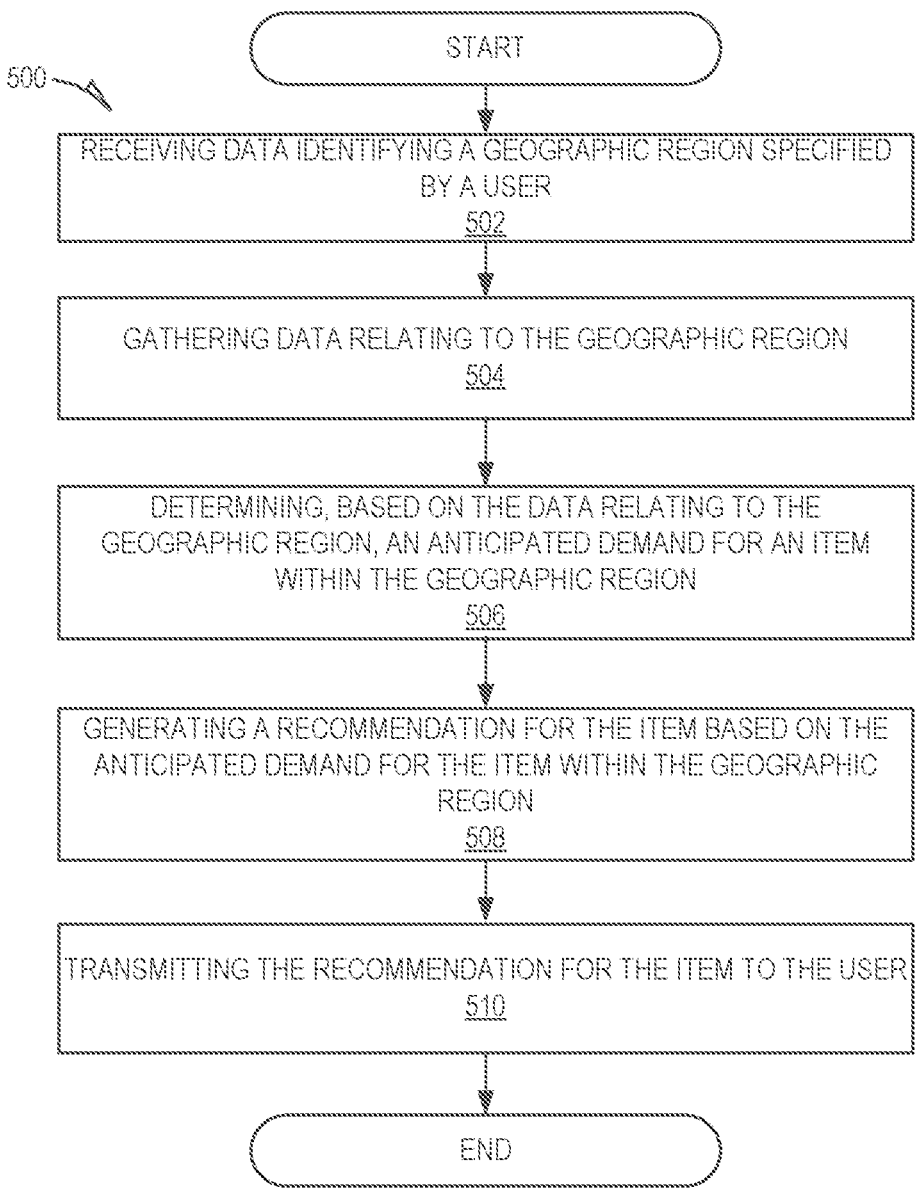
FIG. 5 is a flowchart showing an example method of automatically generating offers for an item, according to certain example embodiments.

FIG. 5 is a flowchart showing an example method 500 of automatically generating offers for an item, according to certain example embodiments. The method 500 may be embodied in computer readable instructions for execution by one or more processors such that the operations of the method 500 may be performed in part or in whole by the geographic recommendation platform 108; accordingly, the method 500 is described below by way of example with reference thereto. However, it shall be appreciated that at least some of the operations of the method 500 may be deployed on various other hardware configurations and the method 500 is not intended to be limited to the geographic recommendation platform 108.

At operation 502, the input module 202 receives data identifying a geographic region specified by a user. The interface module 202 provides a recommendation user interface that enables a user to the request demand data and/or recommendations, as well as view generated recommendations. The recommendation user interface provides user interface elements (e.g., text boxes, buttons, etc.) that enable a user to generate a request for a recommendation. For example, the user uses the recommendation user interface to enter data identifying a specific item, items and/or category of items, as well as a geographic region for the requested recommendation. The recommendation generation module 208 uses the submitted data to generate a corresponding recommendation for the user. The interface module 202 may present the user with the resulting recommendation within the recommendation user interface.

The recommendation user interface also enables a user to enroll/opt-in to receive recurring recommendations. For example, the user may use the recommendation user interface to provide parameters associated with the recommendations the user would like to receive. For example, the parameters may identify an item, items, types of items, etc., for which the user would like to receive recommendations. The parameters may also indicate a geographic region or regions for the recommendations. The user may also designate threshold anticipated demand levels for the recommendations. For example, the user may choose to receive recommendations for items that have an anticipated demand that is at or above the threshold anticipated level. As another example, the user may wish to receive recommendations for items that have an anticipated demand that is below the threshold anticipated demand level.

At operation 504, the data gathering module 204 gathers data relating to the geographic region. The data gathering module 204 gathers data used to generate recommendations. The data includes historical sale data for the online marketplace, demographic user data, and/or geographic data. The historical sale data includes data describing listings previously posted to the online marketplace, such as the items listed for sale, the listed sale price, whether the item was sold, an elapsed time until the item was sold, the user that purchased the item, demographic data associated with the purchasing user, etc. The demographic user data includes data describing users, such as their addresses, age, job, education level, nationality, etc. Geographic data describes a geographic region itself, such as events occurring in the geographic area. The data gathering module 204 gathers the data from the data storage 214 and/or third-party data providers (not shown). Although the data storage 214 is shown as being a part of the geographic recommendation platform 108, the data storage 214 or a portion thereof may be included in the online marketplace service 106. For example, the online marketplace service 106 may use the data storage 214 to store user account and listing data for the online marketplace.

At operation 506, the anticipated demand determination module 206 determines, based on the data relating to the geographic region, an anticipated demand for the item within the geographic region. The anticipated demand determination module 206 may determine an anticipated demand for an item based on a subset of the data that is specific to the geographic region. For example, the anticipated demand determination module 206 may use historical sales data describing listing posted by and/or purchased by users located within the geographic region to determine the anticipated demand for an item within the geographic region. The anticipated demand determination module 206 may also use data associated with other geographic regions. For example, the anticipated demand determination module 206 may identify similar geographic regions (e.g., similar location, similar demographic makeup, etc.) and use the aggregated data from the similar geographic regions to generate recommendations for users within those regions. As another example, the anticipated demand determination module 206 may use the anticipated demand for an item within a geographic region to make recommendations to users located in other similar geographic regions.

In some embodiments, the anticipated demand determination module 206 may determine the anticipated demand for items based on a state or expected state of the geographic region. The state of the geographic region indicates the condition of the geographic region at a given time. For example, the state may indicate the weather condition, time of year, natural disasters, upcoming events, etc. The anticipated demand determination module 206 may determine the current and or upcoming state of a geographic region and determine an estimated demand for items in the geographic region based on historical sales data gathered during a similar or same state. For example, the historical sales data may indicate that the number of fans sold during a heat wave increased. Accordingly, the anticipated demand determination module 206 may use this data to determine that there is a high anticipated demand for fans during an existing or upcoming heat wave within the geographic area. As another example, the historical data may indicate that the number of binders sold prior to the beginning of the school year increased. Accordingly, the anticipated demand determination module 206 may determine that there is a high anticipated demand for binders within a geographic prior to the beginning of the new school year.

At operation 508, the recommendation generation module 208 generates a recommendation for the item based on the anticipated demand for the item within the geographic region. The recommendation may include data identifying the anticipated demand for the item. For example, the recommendation may include the value of the anticipated demand, such as a numeric value. Alternatively, the recommendation may include a representation of the anticipated demand, such as a high, medium or low. The recommendation generation module 208 determines the representation using threshold values defining ranges for each representation. For example, the recommendation generation module 208 determines which range the anticipated demand falls within and then uses the corresponding representation.

The generated recommendation also includes a written recommendation regarding whether the user should or should not list the item for sale. The recommendation generation module 208 may determine the recommendation based on the anticipated demand. For example, the recommendation generation module 208 may include a recommendation to list an item when the anticipated demand is above a threshold level. Alternatively, the recommendation generation module 208 may include a recommendation to not list an item when the anticipated demand is below a threshold level.

The generated recommendation may also include data explaining the anticipated demand and/or the recommendation. For example, the anticipated demand determination module 206 may provide the recommendation generation module 208 with data describing the factors that were factors in the anticipated demand for the item. The recommendation generation module 208 may include an explanation based on the provided factors, such as explaining that the anticipated demand is high due to an upcoming event, a high number of sales of the item in a similar geographic region, a high number of sales within the region, etc. As another example, the recommendation generation module 208 may include an explanation indicating that the anticipated demand is low because there is high available inventory for the item within the geographic region, the item does not sell well during a current and or upcoming state of the geographic region, etc.

The generated recommendation may also enable a user to begin the process of listing the item on the online marketplace. For example, the generated recommendation may include user interface elements, such as buttons, text boxes, etc., that the user may use to enter date, select post a listing, etc.

At operation 510, the output module 212 transmits the recommendation for the item to the user. The output module 212 may transmit the recommendation using any of a variety of communication methods, such as email, text message, in-app message, etc.

Figure 6:
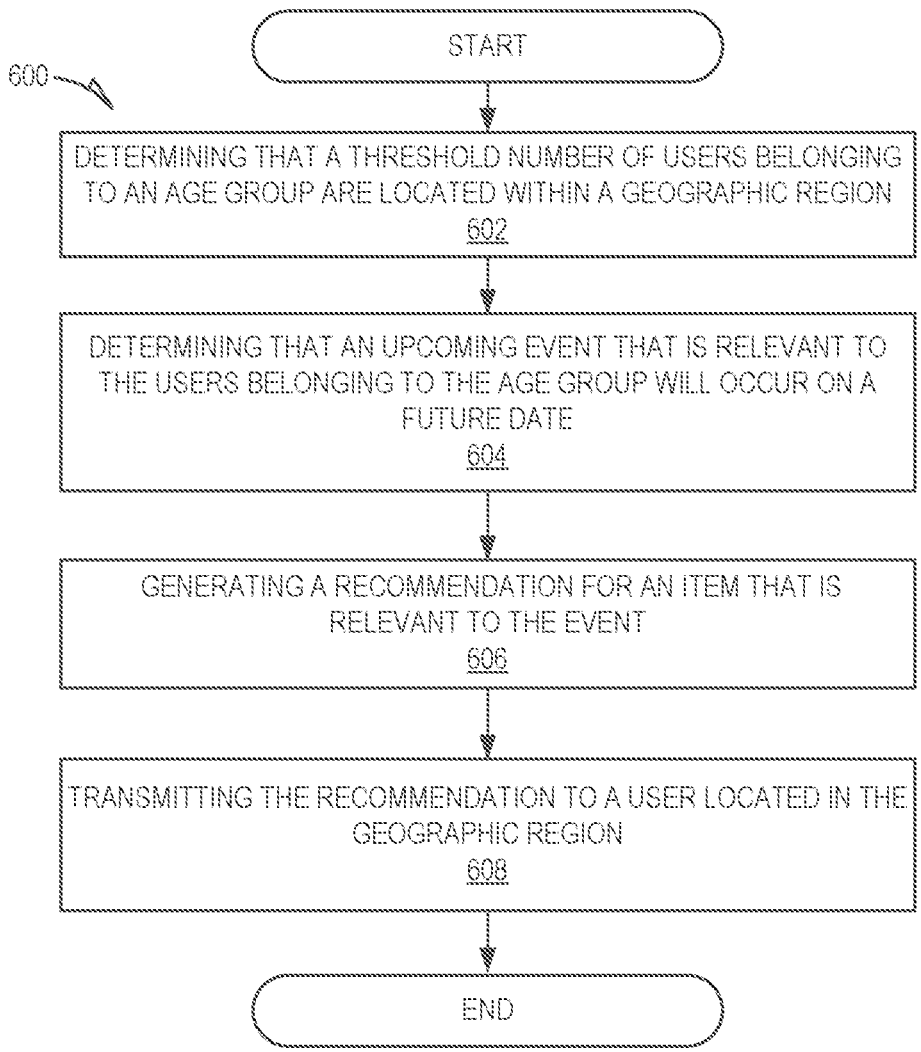
FIG. 6 is a flowchart showing an example method of generating a recommendation based on demographic and event data, according to certain example embodiments.

FIG. 6 is a flowchart showing an example method 600 of generating a recommendation based on demographic and event data, according to certain example embodiments. The method 600 may be embodied in computer readable instructions for execution by one or more processors such that the operations of the method 600 may be performed in part or in whole by the geographic recommendation platform 108; accordingly, the method 600 is described below by way of example with reference thereto. However, it shall be appreciated that at least some of the operations of the method 600 may be deployed on various other hardware configurations and the method 600 is not intended to be limited to the geographic recommendation platform 108.

At operation 602, the demographic group identification module 302 determines that a threshold number of users belonging to an age group are located within a geographic region.

At operation 604, the state determination module 304 determines that an upcoming event that is relevant to the users belonging to the age group will occur on a future date in the geographic region. The state determination module 304 determines this based on geographic data indicating the upcoming events in the geographic area. Age is just one example of a demographic group and is not meant to be limiting. The demographic groups may be based on any type of demographic factor, such as ethnicity. For example, if a community has majority population of Asian Indian people who celebrate Diwali, recommendations may be made before the Festival for the decorative lights and other highly popular items that are in higher demand due to the upcoming holiday. Similarly, using age as a demographic factor, if locality has a majority population of families that have school going children then items popular and relevant around 'back to school' would make a great selling suggestion.

At operation 606, the recommendation generation module 208 generates a recommendation for an item that is relevant to the event. The recommendation includes a written recommendation indicating that the user should list the item for sale. The generated recommendation may also include data explaining the recommendation. The recommendation may indicate that there is significant population of users in the age group that are located in the geographic region and that users in the age group are likely to purchase the item because of the upcoming event relevant to the users in the age group.

At operation 608, the output module 212 transmits the recommendation to a user located in the geographic region. The output module 212 may transmit the recommendation using any of a variety of communication methods, such as email, text message, in-app message, etc.

Software Architecture

Figure 7:
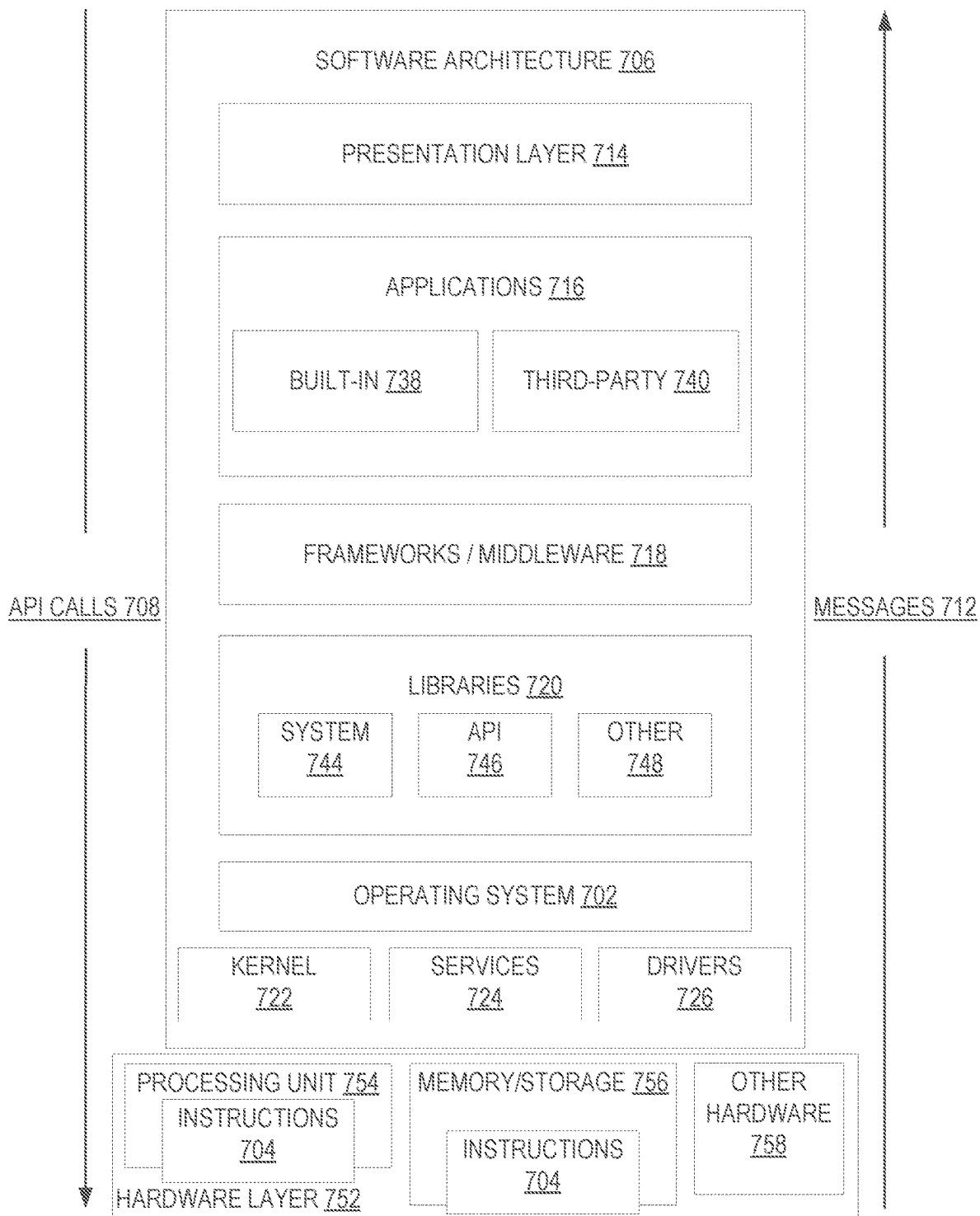
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke Application Programming Interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
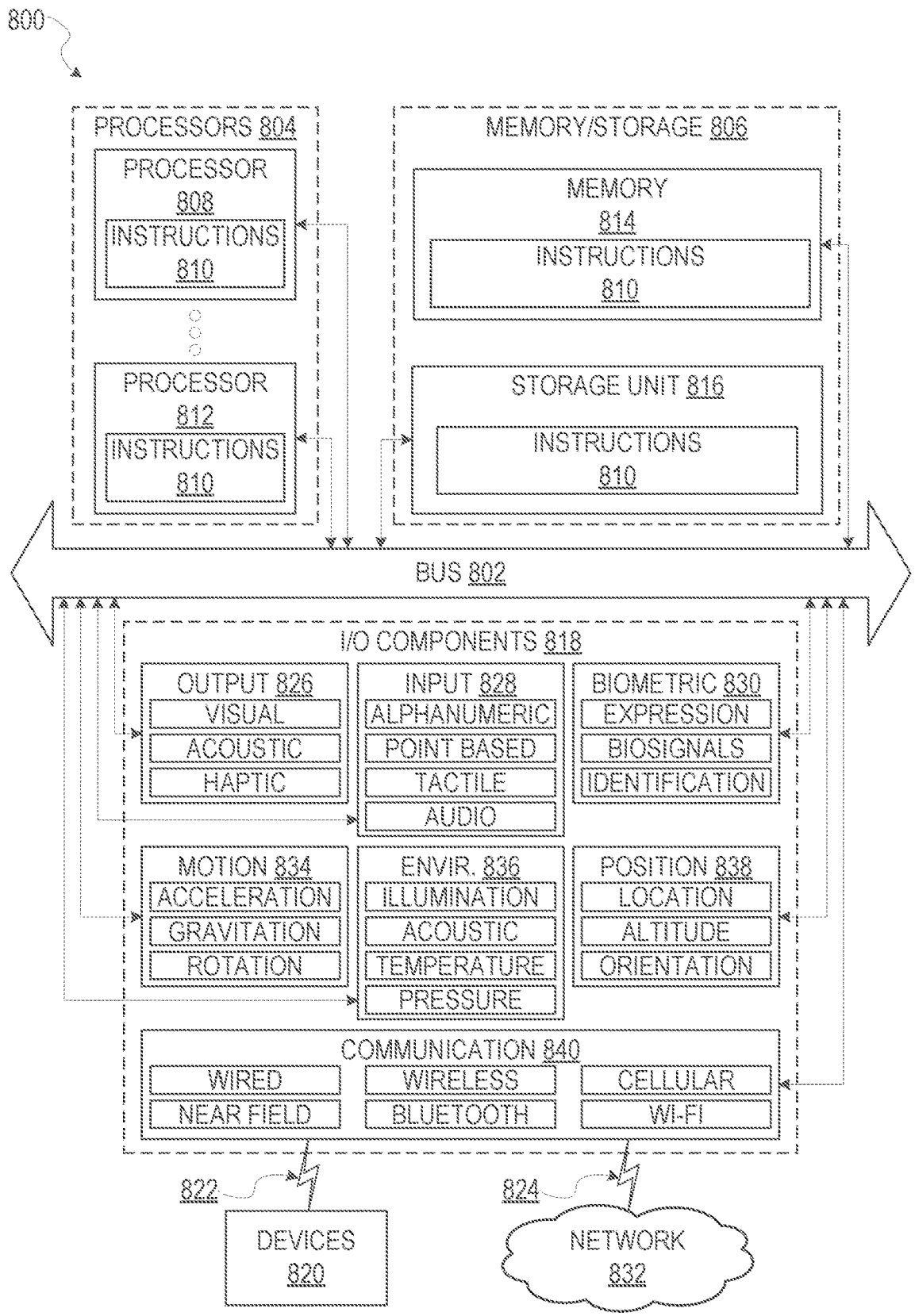
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 804 (sometimes referred to as "cores") that may execute instructions 810 contemporaneously.

What is claimed is:
1. A method comprising:
  causing presentation, at a user device, of a first graphical user interface having:
    a text field user interface control element configured to receive location data; and
    a first graphical user interface button element configured to receive a request for a recommendation;
  receiving at the first graphical user interface, a user input at the text field user interface control element that includes the location data and a selection of the first graphical user interface button for the request for a recommendation, the location data identifying a geographic region;
  gathering data relating to the geographic region;
  for a set of items, determining, based on the data relating to the geographic region, an anticipated demand for the set of items within the geographic region, the anticipated demand indicating how likely the set of items is to be purchased by a user that is located within the geographic region;
  generating a recommendation for the set of items based on the anticipated demand for the set of items, the recommendation including:
    the anticipated demand for the set of items within the geographic region; and
    a listing of items within the set of items;
  causing presentation, at the user device, a second graphical user interface that includes the listing of the items and the location data, the items in the listing of the items being selectable to show data for the items providing factors in the anticipated demand, the second graphical user interface being presented in response to receiving the selection of the first graphical user interface button for the request for a recommendation;
  receiving an indication of one of the selectable items within the second graphical user interface relating to a selection of an item in the listing of the items;
  causing presentation, at the user device, of a third graphical user interface, the third graphical user interface including:
    the data providing a description indicating reasons the anticipated demand of the item in the listing of the items is at a given level in response to the indication of one of the selectable item within the second graphical user interface; and
    a third graphical user interface button element configured to receive a selection to create a listing on an online marketplace to sell the item in the listing of the items;
  receiving selection of the third graphical user interface button;
  creating the listing on the online marketplace to sell the item in the listing of the items in response to receiving the selection of the third graphical user interface button.

2. The method of claim 1, further comprising receiving, from the user device of the first user, a request for demand data, the request identifying the set of items, wherein the recommendation is transmitted to the first user in response to the request.

3. The method of claim 1, wherein the data relating to the geographic region includes data describing items listed for sale on the online marketplace and data describing items purchased from the online marketplace.

4. The method of claim 3, wherein determining the anticipated demand for the set of items within the geographic region comprises:
  determining, based on the data relating to the geographic region, a number of sales of the set of items that were made by users located within the geographic region within a predetermined time period; and determining the anticipated demand for the set of items within the geographic region based on the number of sales of the set of items that were made by users located within the geographic region within a predetermined time period.

5. The method of claim 3, wherein determining the anticipated demand for the set of items within the geographic region comprises:
  determining a current state of the geographic region;
  determining, based on the data relating to the geographic region, a number of previous sales of the set of items that were made by users located within the geographic region under a state that is similar to the current state; and
  determining the anticipated demand for the set of items within the geographic region based on the number of previous sales of the set of items that were made by users located within the geographic region under a state that is similar to the current state.

6. The method of claim 5, wherein the current state indicates a time of year.

7. The method of claim 1, wherein determining the anticipated demand for the set of items within the geographic region comprises:
  determining, based on the data relating to the geographic region, a set of demographic groups of users located within the geographic region;
  determining that a percentage of users located in the geographic region that are included in a first demographic group of users from the set of demographic groups of users located within the geographic region transgresses a threshold percentage;
  determining, based on historical sales data indicating items purchased from the online marketplace, a number of previous sales of the set of items that were made by a set of users included in the first demographic group, the set of users including at least one user that is located in a second geographic region that is different than the geographic region; and
  determining the anticipated demand for the set of items within the geographic region based on the number of previous sales of the set of items that were made by a set of users included in the first demographic group.

8. The method of claim 1, wherein generating the recommendation for an item from the set of items comprises:
  ranking the set of items based on a determined anticipated demand for each respective item within the geographic region; and
  selecting an item of the set of items based on the ranking.

9. A system comprising:
  one or more computer processors; and
  one or more computer-readable mediums storing instructions that, when executed by the one or more computer processors, cause the system to perform operations comprising:
  causing presentation, at a user device, of a first graphical user interface having:
    a text field user interface control element configured to receive location data; and
    a first graphical user interface button element configured to receive a request for a recommendation;
  receiving at the first graphical user interface, a user input at the text field user interface control element that includes the location data and a selection of the first graphical user interface button for the request for a recommendation, the location data identifying a geographic region;
  gathering data relating to the geographic region;
  for a set of items, determining, based on the data relating to the geographic region, an anticipated demand for the set of items within the geographic region, the anticipated demand indicating how likely the set of items is to be purchased by a user that is located within the geographic region;
  generating a recommendation for from the set of items based on the anticipated demand for the set of items, the recommendation including:
    the anticipated demand for the first item within the geographic region; and
    a listing of items within the set of items;
  causing presentation, at the user device, a second graphical user interface that includes the listing of the items and the location data, the items in the listing of the items being selectable to show data for the items providing factors in the anticipated demand, the second graphical user interface being presented in response to receiving the selection of the first graphical user interface button for the request for a recommendation;
  receiving an indication of one of the selectable items within the second graphical user interface relating to selection of an item in the listing of the items;
  causing presentation, at the user device, of a third graphical user interface, the third graphical user interface including:
    the data providing a description indicating reasons the anticipated demand of the item in the listing of the items is at a given level in response to the indication of one of the selectable item within the second graphical user interface; and
    a third graphical user interface button element configured to receive a selection to create a listing on an online marketplace to sell the item in the listing of the items;
  receiving selection of the third graphical user interface button;
  creating the listing on the online marketplace to sell the item in the listing of the items in response to receiving the selection of the third graphical user interface button.

10. The system of claim 9, the operations further comprising receiving, from the user device of the first user, a request for demand data, the request identifying the set of items, wherein the recommendation is transmitted to the first user in response to the request.

11. The system of claim 9, wherein the data relating to the geographic region includes data describing items listed for sale on the online marketplace and data describing items purchased from the online marketplace.

12. The system of claim 11, wherein determining the anticipated demand for the set of items within the geographic region comprises:
  determining, based on the data relating to the geographic region, a number of sales of the set of items that were made by users located within the geographic region within a predetermined time period; and
  determining the anticipated demand for the set of items within the geographic region based on the number of sales of the set of items that were made by users located within the geographic region within a predetermined time period.

13. The system of claim 11, wherein determining the anticipated demand for the set of items within the geographic region comprises:
  determining a current state of the geographic region;

determining, based on the data relating to the geographic region, a number of previous sales of the set of items that were made by users located within the geographic region under a state that is similar to the current state; and determining the anticipated demand for the first item within the geographic region based on the number of previous sales of the set of items that were made by users located within the geographic region under a state that is similar to the current state.

14. The system of claim 13, wherein the current state indicates a time of year.

15. The system of claim 9, wherein determining the anticipated demand for the set of items within the geographic region comprises:

determining, based on the data relating to the geographic region, a set of demographic groups of users located within the geographic region;

determining that a percentage of users located in the geographic region that are included in a first demographic group of users from the set of demographic groups of users located within the geographic region transgresses a threshold percentage;

determining, based on historical sales data indicating items purchased from the online marketplace, a number of previous sales of the set of items that were made by a set of users included in the first demographic group, the set of users including at least one user that is located in a second geographic region that is different than the geographic region; and determining the anticipate demand for the set of items within the geographic region based on the number of previous sales of the set of items that were made by a set of users included in the first demographic group.

16. The system of claim 9, wherein generating the recommendation for an item from the set of items comprises:

ranking the set of items based on a determined anticipated demand for each respective item within the geographic region; and selecting the item based on the ranking.

17. A non-transitory computer-readable medium storing instructions that, when executed by one or more computer processors of a computing system, cause the computing system to perform operations comprising:

causing presentation, at a user device, of a first graphical user interface having:

a text field user interface control element configured to receive location data; and a first graphical user interface button element configured to receive a request for a recommendation;

receiving at the first graphical user interface, a user input at the text field user interface control element that includes the location data and a selection of the first graphical user interface button for the request for a recommendation, the location data identifying a geographic region;

gathering data relating to the geographic region;

for a set of items, determining, based on the data relating to the geographic region, an anticipated demand for the set of items within the geographic region, the anticipated demand indicating how likely the set of items is to be purchased by a second user that is located within the geographic region;

generating a recommendation for the set of items based on the anticipated demand for the set of items, the recommendation including:

the anticipated demand for the set of items within the geographic region; and a listing of items within the set of items;

causing presentation, at the user device, a second graphical user interface that includes the listing of the items and the location data, the items in the listing of the items being selectable to show data for the items providing factors in the anticipated demand, the second graphical user interface being presented in response to receiving the selection of the first graphical user interface button for the request for a recommendation;

receiving an indication of one of the selectable items within the second graphical user interface relating to selection of an item in the listing of the items;

causing presentation, at the user device, of a third graphical user interface, the third graphical user interface including:

the data providing a description indicating reasons the anticipated demand of the item in the listing of the items is at a given level in response to the indication of one of the selectable item within the second graphical user interface; and a third graphical user interface button element configured to receive a selection to create a listing on an online marketplace to sell the item in the listing of the items;

receiving selection of the third graphical user interface button;

creating the listing on the online marketplace to sell the item in the listing of the items in response to receiving the selection of the third graphical user interface button.

18. The non-transitory computer-readable medium of claim 17, wherein the data relating to the geographic region includes data describing items listed for sale on the online marketplace and data describing items purchased from the online marketplace and the instructions, when determining the anticipated demand for the set of items within the geographic region, further cause the computing system to perform operations comprising:

determining, based on the data relating to the geographic region, a number of sales of the set of items that were made by users located within the geographic region within a predetermined time period; and determining the anticipated demand for the set of items within the geographic region based on the number of sales of the set of items that were made by users located within the geographic region within a predetermined time period.

19. The non-transitory computer-readable medium of claim 17, wherein the data relating to the geographic region includes data describing items listed for sale on the online marketplace and data describing items purchased from the online marketplace and the instructions, when determining the anticipated demand for the set of items within the geographic region, further cause the computing system to perform operations comprising:

determining a current state of the geographic region;

determining, based on the data relating to the geographic region, a number of previous sales of the set of items that were made by users located within the geographic region under a state that is similar to the current state; and determining the anticipate demand for the set of items within the geographic region based on the number of previous sales of the set of items that were made by users located within the geographic region under a state that is similar to the current state.

20. The non-transitory computer-readable medium of claim 17, wherein the instructions, when determining the anticipated demand for the set of items within the geographic region, further cause the computing system to perform operations comprising:
 determining, based on the data relating to the geographic region, a set of demographic groups of users located within the geographic region;
 determining that a percentage of users located in the geographic region that are included in a first demographic group of users from the set of demographic groups of users located within the geographic region transgresses a threshold percentage;
 determining, based on historical sales data indicating items purchased from the online marketplace, a number of previous sales of the set of items that were made by a set of users included in the first demographic group, the set of users including at least one user that is located in a second geographic region that is different than the geographic region; and
 determining the anticipated demand for the set of items within the geographic region based on the number of previous sales of the set of items that were made by a set of users included in the first demographic group.

* * * * *